(12) United States Patent
Nien et al.

(10) Patent No.: US 8,742,739 B2
(45) Date of Patent: Jun. 3, 2014

(54) VOLTAGE REGULATOR CONTROLLER AND RELATED REFERENCE VOLTAGE ADJUSTING METHOD

(75) Inventors: Hung-Shou Nien, Changhua (TW); Yi-Chiang Fu, Taipei (TW); Chung-Sheng Cheng, Zhubei (TW); Ren-Cheng Huang, Miaoli County (TW); Chih-Min Wang, Kaohsiung (TW)

(73) Assignee: Richtek Technology Corporation, Zhubei (TW)

( * ) Notice: Subject to any disclaimer, the term of this patent is extended or adjusted under 35 U.S.C. 154(b) by 70 days.

(21) Appl. No.: 13/594,130

(22) Filed: Aug. 24, 2012

(65) Prior Publication Data

US 2013/0049720 A1 Feb. 28, 2013

(30) Foreign Application Priority Data

Aug. 26, 2011 (TW) .............................. 100130828 A

(51) Int. Cl.
*G05F 1/40* (2006.01)
(52) U.S. Cl.
USPC ........................................................ 323/282
(58) Field of Classification Search
USPC ........................ 323/271, 282–285, 288, 290
See application file for complete search history.

(56) References Cited

U.S. PATENT DOCUMENTS

| | | | |
|---|---|---|---|
| 4,823,070 A * | 4/1989 | Nelson .......................... | 323/285 |
| 5,745,352 A | 4/1998 | Sandri et al. | |
| 7,106,032 B2 * | 9/2006 | Chen et al. .................... | 323/269 |
| 7,245,113 B2 | 7/2007 | Chen et al. | |
| 8,040,118 B2 * | 10/2011 | Cho et al. ...................... | 323/273 |
| 8,575,903 B2 * | 11/2013 | Hua et al. ...................... | 323/273 |
| 2003/0231012 A1 * | 12/2003 | Corva et al. ................... | 323/285 |
| 2006/0170403 A1 * | 8/2006 | Im ................................. | 323/280 |
| 2007/0159155 A1 * | 7/2007 | Itoh ............................... | 323/316 |
| 2008/0174292 A1 * | 7/2008 | Nishida ......................... | 323/284 |
| 2010/0164550 A1 * | 7/2010 | Son ................................. | 327/88 |
| 2011/0101937 A1 * | 5/2011 | Dobkin et al. ................ | 323/282 |

* cited by examiner

*Primary Examiner* — Adolf Berhane
(74) *Attorney, Agent, or Firm* — Birch, Stewart, Kolasch & Birch, LLP

(57) ABSTRACT

A voltage regulator controller is disclosed including: a reference voltage generator for generating a reference voltage; a comparison circuit, coupled with the reference voltage generator, for comparing the reference voltage with an output voltage of a voltage regulator; and a control circuit, coupled with the reference voltage generator and the comparison circuit, for controlling the reference voltage generator to stepwise lower the reference voltage when a power saving command is received by the voltage regulator controller.

9 Claims, 7 Drawing Sheets

VOLTAGE REGULATOR CONTROLLER AND RELATED REFERENCE VOLTAGE ADJUSTING METHOD

CROSS-REFERENCE TO RELATED APPLICATIONS

This application claims the benefit of priority to Taiwanese Patent Application No. 100130828, filed on Aug. 26, 2011; the entirety of which is incorporated herein by reference for all purposes.

BACKGROUND

The present disclosure generally relates to a voltage controller and, more particularly, to a voltage regulator controller with a high efficiency and related reference voltage adjusting method.

For many power converters, high energy utilization efficiency is the main design objective. For example, the VR12 specification proposed by Intel requires a voltage regulator controller to improve the operating performance of the CPU while maintaining the operating efficiency of a voltage regulator in a light load operation.

FIG. 1 is a simplified functional block diagram of a power control system 100 in the traditional computer. The power control system 100 comprises a processor 110, a voltage control interface 120, and a power converter 130.

When the load of the power control system 100 reduces, the processor 110 transmits a Decay command to the power converter 130 via the voltage control interface 120 to request the power converter 130 to lower the output voltage Vout to a specified voltage level so as to reduce power consumption.

A timing diagram shown in FIG. 2 illustrates the change of output voltage of the power converter 130. In the example of FIG. 2, the processor 110 transmits the Decay command to the power converter 130 at time point T1 to request the power converter 130 to lower the output voltage Vout from an original voltage level VID1 to a lower voltage level VID2.

In order to fulfill the request of the Decay command from the processor 110, the traditional power converter 130 linearly reduces an internal reference voltage Vref for controlling the output voltage Vout to a target voltage level VID2 specified by the Decay command when received the Decay command, and stops the voltage regulation operations. As a result, the output voltage Vout of the power converter 130 would gradually reduce to the target voltage level VID2 due to the current consumption of the load.

When the output voltage Vout of the power converter 130 is reduced to the target voltage level VID2 at a time point T2, the power converter 130 resumes the voltage regulation operations, so that the output voltage Vout can be maintained in or to be close to the target voltage level VID2.

A timing diagram shown in FIG. 3 illustrates the change of output voltage of the power converter 130 in another situation. In the example of FIG. 3, the processor 110 issues a Dynamic Voltage ID (DVID) command to the power converter 130 before the output voltage Vout of the power converter 130 reaches the target voltage level VID2, such as at a time point T3, to request the power converter 130 to pull up the output voltage Vout to another target voltage level VID3. In this situation, the power converter 130 would gradually increase the internal reference voltage Vref from the current voltage level VID2 to the new target voltage level VID3.

When the internal reference voltage Vref of the power converter 130 is increased to be greater than or equal to the current voltage level, VB, of the output voltage Vout for the time being at a time point T4, the power converter 130 resumes the voltage regulation operations to gradually increase the output voltage Vout to the target voltage level VID3.

When the output voltage Vout of the power converter 130 is increased to the new target voltage level VID3 at a time point T5, the power converter 130 performs the voltage regulation operations to maintain the output voltage Vout in or to be close to the target voltage VID3.

In other words, after the processor 110 issues the DVID command, the power converter 130 has to wait for a time period P1 before conducting the voltage regulation operations. Accordingly, a total time length TA (=P1+P2) should be taken for calibrating the output voltage Vout to the new target voltage level VID3, and thus the voltage adjusting speed is limited.

In addition, as shown in FIG. 3, in the period from the time point T3 to the time point T4, during which the internal reference voltage Vref is gradually increased from the voltage level VID2 to the new target voltage level VID3 by the power converter 130, the output voltage Vout of the power converter 130 first gradually reduces from the voltage level VA of the time point T3 to the voltage level VB of the time point T4, and then gradually increases.

However, energy is wasted in the period during which the output voltage Vout of the power converter 130 first decreases and then increases, thereby reducing the energy conversion efficiency of the power converter 130.

SUMMARY

In view of the foregoing, it can be appreciated that a substantial need exists for methods and apparatuses that can improve the energy conversion efficiency of the power converter and increase the voltage adjusting speed.

An example embodiment of a voltage regulator controller is disclosed comprising: a reference voltage generator for generating a reference voltage according to a digital control signal; a comparison circuit, coupled with the reference voltage generator, for comparing the reference voltage with an output voltage of a voltage regulator; a control circuit, coupled with the reference voltage generator and the comparison circuit, for generating the digital control signal and for generating a first control signal according to a comparison result of the comparison circuit; and a PWM signal generator, coupled with the control circuit, for controlling the voltage regulator according to the first control signal; wherein when a power saving command from a voltage control interface is received by the voltage regulator controller, the PWM signal generator stops operations and the control circuit adjusts the digital control signal to stepwise lower the reference voltage.

Another example embodiment of a voltage regulator controller is disclosed comprising: a reference voltage generator for generating a reference voltage; a comparison circuit, coupled with the reference voltage generator, for comparing the reference voltage with an output voltage of a voltage regulator; and a control circuit, coupled with the reference voltage generator and the comparison circuit, for controlling the reference voltage generator to stepwise lower the reference voltage when a power saving command is received by the voltage regulator controller.

Another example embodiment of a voltage regulator controller is disclosed comprising: a reference voltage generator for generating a reference voltage; a comparison circuit, coupled with the reference voltage generator, for comparing the reference voltage with an output voltage of a voltage regulator; and a control circuit, coupled with the reference voltage generator, for controlling the reference voltage generator to lower the reference voltage when a power saving command is received by the voltage regulator controller, and for, when a difference between the output voltage and a lowered reference voltage is less than a threshold, controlling the reference voltage generator to lower the reference voltage again.

An example embodiment of a method for adjusting a reference voltage of a voltage regulator controller is disclosed. The voltage regulator controller is for controlling a voltage regulator. The method comprises: generating a digital control signal; generating a reference voltage of the voltage regulator controller according to the digital control signal; comparing the reference voltage with an output voltage of the voltage regulator; generating a first control signal according to a comparison result of the reference voltage and the output voltage; controlling the voltage regulator according to the first control signal; and when a power saving command from a voltage control interface is received by the voltage regulator controller, stopping generating of the first control signal and adjusting the digital control signal to stepwise lower the reference voltage.

Another example embodiment of a method for adjusting a reference voltage of a voltage regulator controller is disclosed. The voltage regulator controller is for controlling a voltage regulator. The method comprises: utilizing a reference voltage generator to generate a reference voltage of the voltage regulator controller; when a power saving command is received, controlling the reference voltage generator to lower the reference voltage; comparing a lowered reference voltage with an output voltage of the voltage regulator; and when a difference between the output voltage and the lowered reference voltage is less than a threshold, controlling the reference voltage generator to lower the reference voltage again.

It is to be understood that both the foregoing general description and the following detailed description are example and explanatory only and are not restrictive of the invention, as claimed.

DETAILED DESCRIPTION

Reference will now be made in detail to embodiments of the invention, which are illustrated in the accompanying drawings. The same reference numbers may be used throughout the drawings to refer to the same or like parts or components.

Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

As used herein, the term "and/or" includes any and all combinations of one or more of the associated listed items. In addition, the singular forms "a", "an", and "the" as used herein are intended to include the plural forms as well, unless the context clearly indicates otherwise.

Figure 4:
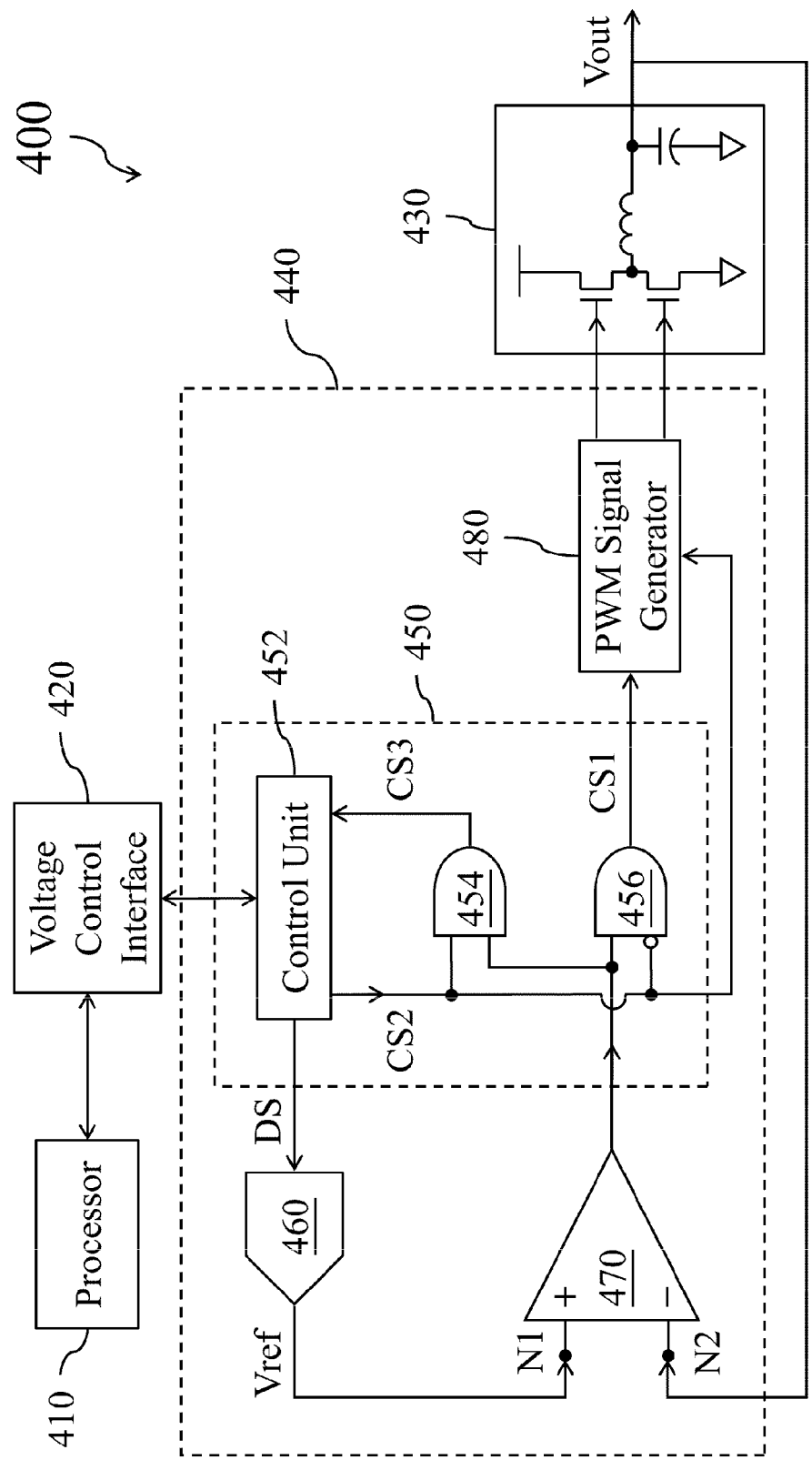
FIG. 4 is a simplified functional block diagram of a power control system according to an example embodiment.

FIG. 4 is a simplified functional block diagram of a power control system 400 according to an example embodiment. The power control system 400 comprises a processor 410, a voltage control interface 420, and a power converter formed by a voltage regulator 430 and a voltage regulator controller 440. In implementations, the voltage control interface 420 may be a serial VID (SVID) interface, or any other transmission interface capable of communicating voltage control command between the processor 410 and the voltage regulator controller 440.

As shown in FIG. 4, the voltage regulator controller 440 comprises a control circuit 450, and a reference voltage generator 460, a comparison circuit 470, and a PWM signal generator 480 coupled with the control circuit 450. The control circuit 450 of this embodiment comprises a control unit 452 and control logics 454 and 456. The reference voltage generator 460 may be implemented by a digital-to-analog converter (DAC).

In operations, the processor 410 transmits power saving commands or voltage adjustment commands to the voltage regulator controller 440 via the voltage control interface 420. The control circuit 450 of the voltage regulator controller 440 generates a digital control signal DS according to the command transmitted from the processor 410, and controls the operations of the PWM signal generator 480. The reference voltage generator 460 generates a reference voltage Vref according to the digital control signal DS outputted from the control circuit 450. The comparison circuit 470 compares the reference voltage Vref with an output voltage Vout of the voltage regulator 430. When the processor 410 transmits a power saving command to the voltage regulator controller 440 via the voltage control interface 420, the voltage regulator controller 440 lowers the output voltage Vout of the voltage regulator 430 to a voltage level set by the power saving command so as to reduce power consumption.

The terms "power saving command" and "voltage adjustment command" as used herein may respectively refer to the Decay command and DVID command defined in the VR12 specification proposed by Intel, or may be commands of similar functions defined in other specifications. The operations of the voltage regulator controller 440 will be further described with reference to FIG. 5.

Figure 5:
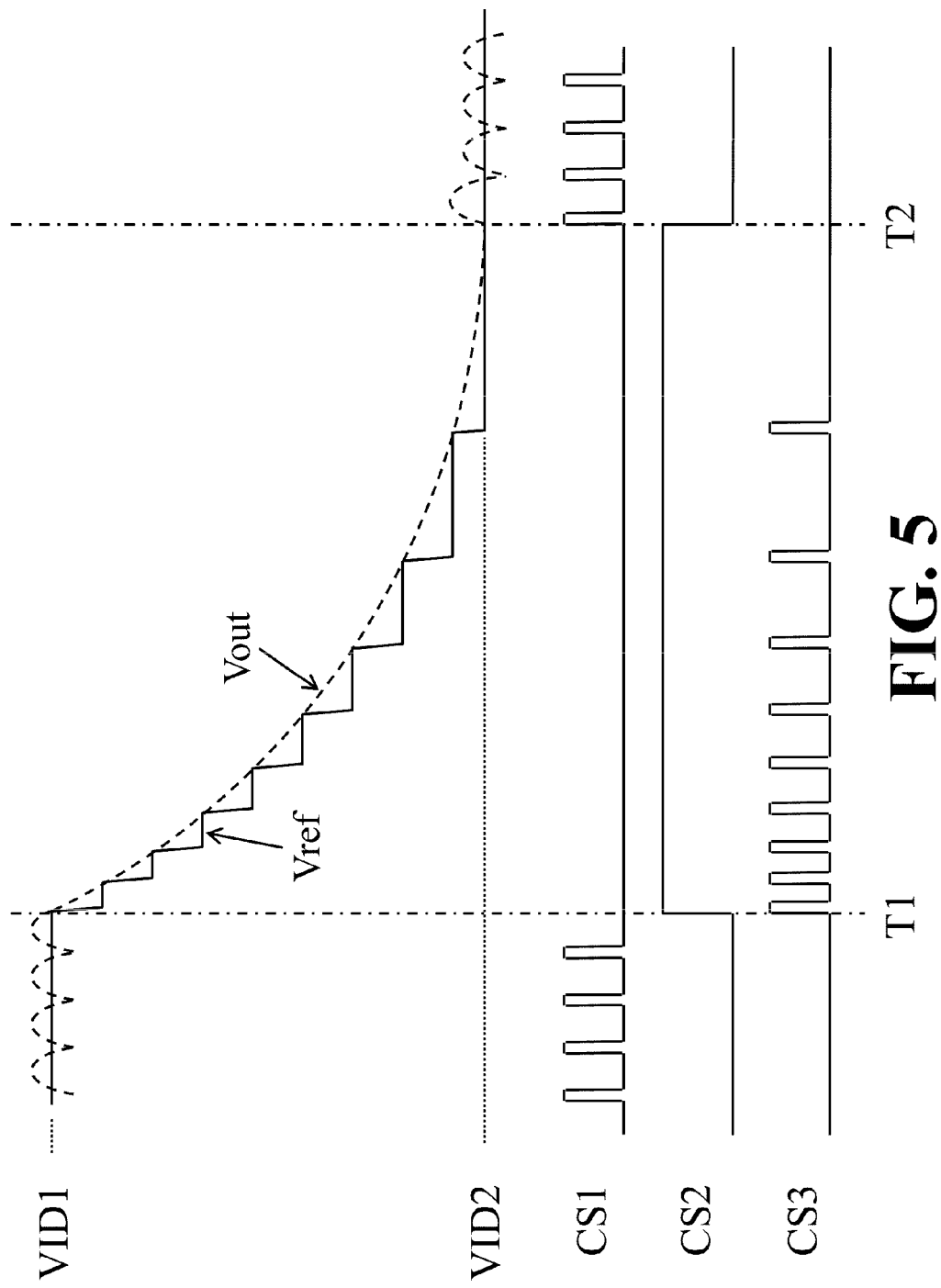
FIG. 5 is a timing diagram illustrating the operation of a voltage regulator controller of FIG. 4 according to an example embodiment.

FIG. 5 is a timing diagram illustrating the operation of a voltage regulator controller 440 according to an example embodiment. In the embodiment of FIG. 5, the processor 410 transmits a power saving command to the voltage regulator controller 440 at a time point T1 to request the voltage regulator controller 440 to lower the output voltage Vout of the voltage regulator 430 from the original voltage level VID1 to a lower voltage level VID2.

Before the power saving command is received by the voltage regulator controller 440, i.e., before the time point T1, the control unit 452 of the control circuit 450 generates a digital control signal DS according to the voltage adjustment command previously transmitted from the processor 410, and the reference voltage generator 460 maintains the reference voltage Vref in the original voltage level VID1 according to the digital control signal DS. At this time, the control logic 456 of the control circuit 450 adjusts a control signal CS1 according to the comparison result of the comparison circuit 470. The PWM signal generator 480 controls the voltage regulator 430 to conduct voltage regulation operation according to the control signal CS1, so that the output voltage Vout of the voltage regulator 430 can be maintained in or to be close to the original voltage level VID1.

When the voltage regulator controller 440 receives the power saving command, the control unit 452 may utilize a control signal CS2 to disable the operations of the PWM signal generator 480 to reduce power consumption. As a result, the voltage regulation operation of the voltage regulator 430 would be suspended, and the output voltage Vout of the voltage regulator 430 would gradually drop to the target voltage level VID2 according to the current consumption of the load.

In addition, when the voltage regulator controller 440 receives the power saving command, the control circuit 450 and the reference voltage generator 460 would not directly lower the reference voltage Vref to the target voltage level VID2. In the embodiment of FIG. 5, the control logic 454 generates a control signal CS3 according to the comparison result of the comparison circuit 470 during the declining process of the output voltage Vout of the voltage regulator 430. Each time the control unit 452 is triggered by the control signal CS3, the control unit 452 controls the reference voltage generator 460 to lower the reference voltage Vref for a certain amount by adjusting the digital control signal DS. As a result, the reference voltage Vref generated by the reference voltage generator 460 would be stepwise lowered following the output voltage Vout of the voltage regulator 430.

In another embodiment, when the voltage regulator controller 440 receives the power saving command, the control circuit 450 adjusts the digital control signal DS to control the reference voltage generator 460 to lower the reference voltage Vref, but would not directly lower the reference voltage Vref to the target voltage level VID2. Afterward, each time the output voltage Vout drops to a level where the difference between the output voltage Vout and the lowered reference voltage Vref is less than a threshold, the control circuit 450 adjusts the digital control signal DS to control the reference voltage generator 460 to again lower the reference voltage Vref, so that the reference voltage Vref is stepwise lowered following to the output voltage Vout of the voltage regulator 430.

In implementations, the adjustment amount of the reference voltage Vref made by the control circuit 450 and the reference voltage generator 460 each time may be fixed or variable.

When the output voltage Vout of the voltage regulator 430 drops to the target voltage level VID2 at the time point T2, the control unit 452 utilizes the control signal CS2 to enable the operations of the PWM signal generator 480. Accordingly, the PWM signal generator 480 controls the voltage regulation operations of the voltage regulator 430 according to the control signal CS1 generated by the control logic 456, so as to maintain the output voltage Vout of the voltage regulator 430 in or to be close to the target voltage level VID2.

Figure 6:
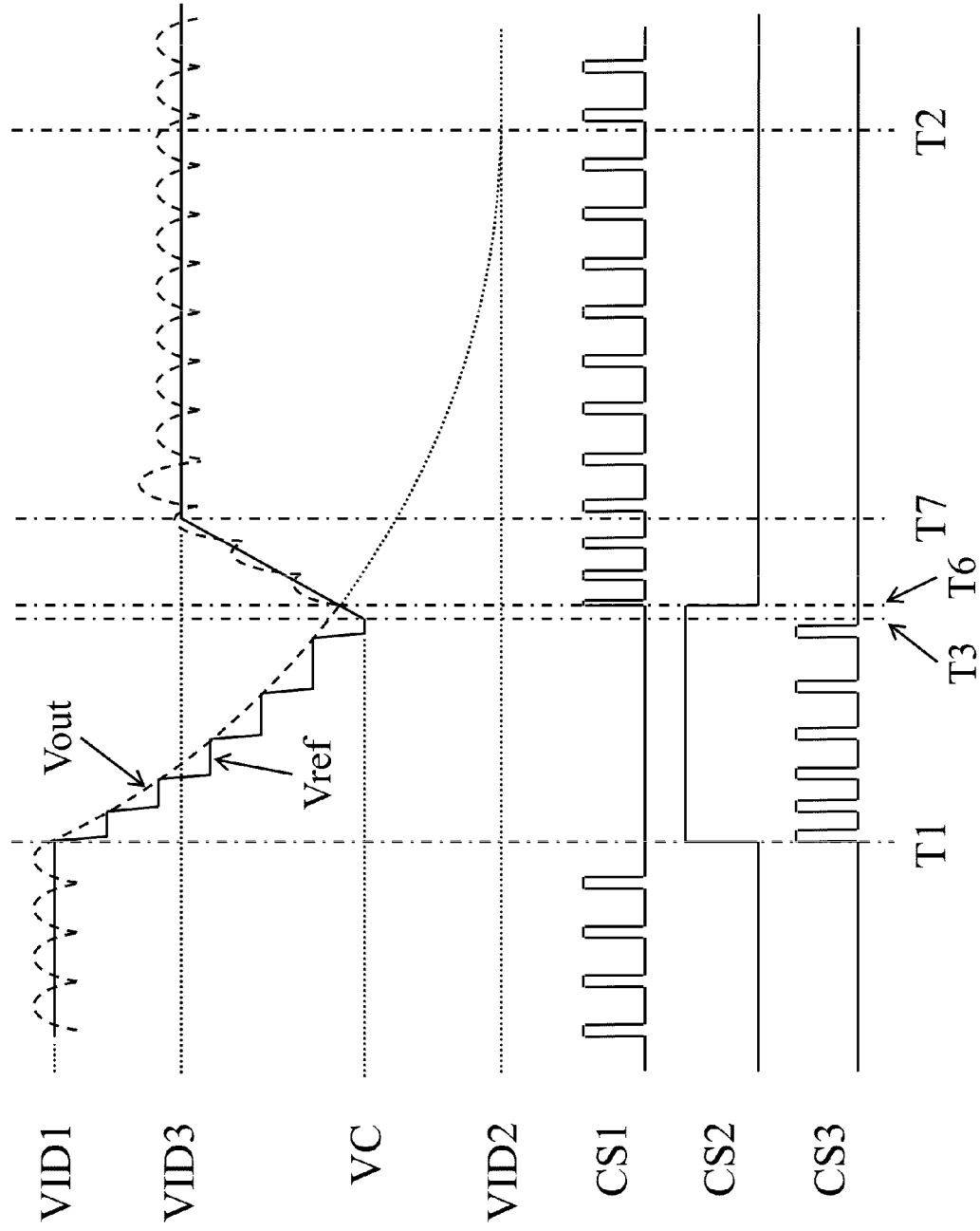
FIG. 6 is a timing diagram illustrating the operation of the voltage regulator controller of FIG. 4 in another situation according to an example embodiment.

FIG. 6 is a timing diagram illustrating the operation of the voltage regulator controller 440 in another situation according to an example embodiment. After the voltage regulator controller 440 receives the afore-mentioned power saving command, and before the output voltage Vout of the voltage regulator 430 reaches the target voltage level VID2, i.e., between the time point T1 and the time point T2, if the processor 410 issues a voltage adjustment command to the voltage regulator controller 440 at a time point T3 to request the voltage regulator controller 440 to pull up the output voltage Vout of the voltage regulator 430 to another voltage level VID3, then the control unit 452 adjusts the digital control signal DS to control the reference voltage generator 460 to increase the reference voltage Vref from a current voltage level VC to the new target voltage level VID3.

When the reference voltage Vref generated by the reference voltage generator 460 is greater than or equal to a current voltage level, VB', of the output voltage Vout at a time point T6, the control unit 452 utilizes the control signal CS2 to enable the operations of the PWM signal generator 480. The PWM signal generator 480 then controls the voltage regulation operations of the voltage regulator 430 according to the control signal CS1 generated by the control logic 456, so as to gradually pull up the output voltage Vout to the target voltage level VID3.

When the output voltage Vout of the voltage regulator 430 is increased to the new target voltage level ViD3 at a time point T7, the PWM signal generator 480 continues to control the voltage regulation operations of the voltage regulator 430 according to the control signal CS1 so that the output voltage Vout of the voltage regulator 430 can be maintained in or to be close to the target voltage level VID3.

Figure 7:
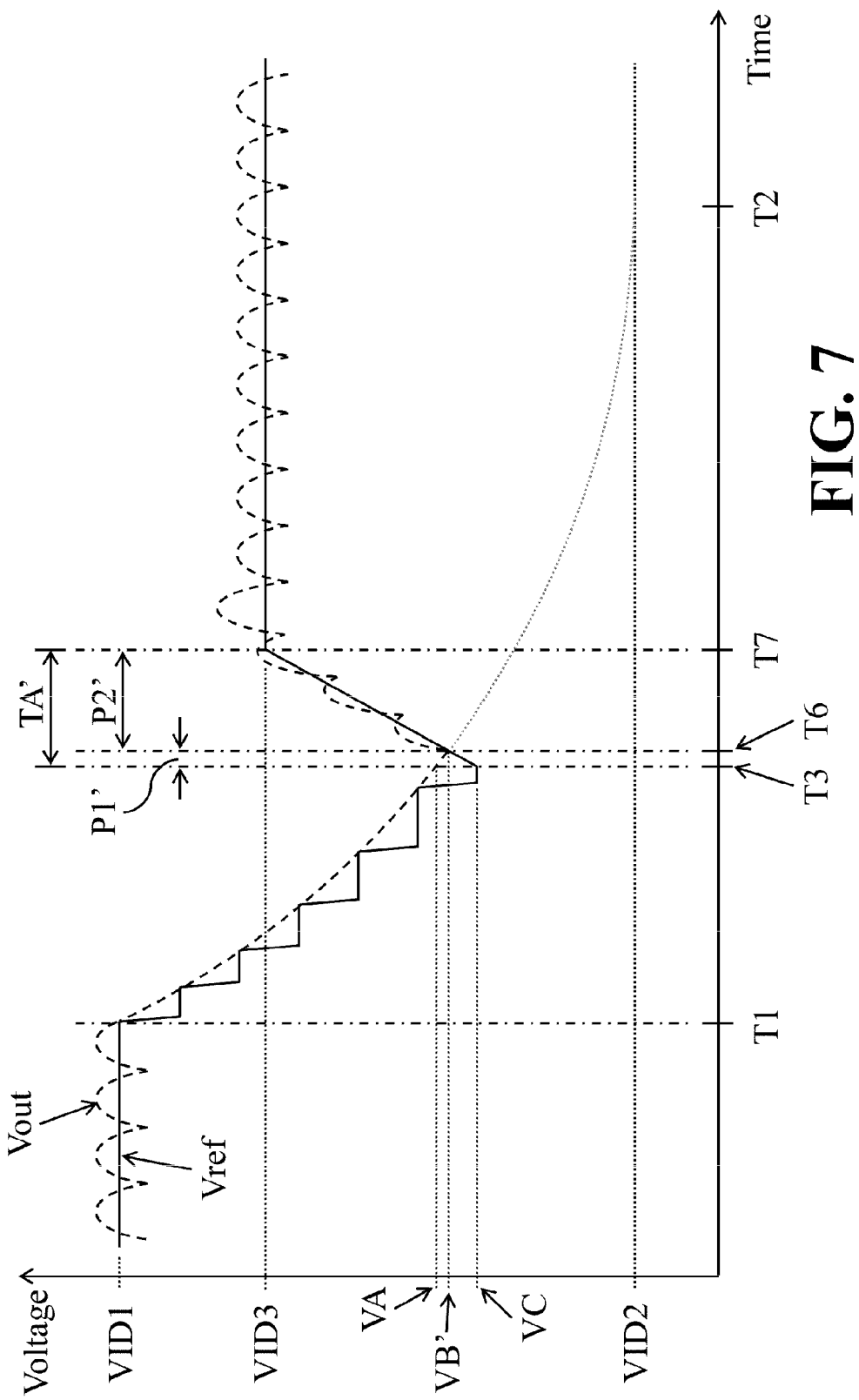
FIG. 7 is a schematic diagram of the relationship between an output voltage and a reference voltage of FIG. 6.

FIG. 7 is a schematic diagram of the relationship between the output voltage Vout and the reference voltage Vref of FIG. 6. As shown in FIG. 7, after the processor 410 issues the voltage adjustment command at the time point T3, the reference voltage Vref generated by the reference voltage generator 460 is increased from the voltage level VC, not the voltage level VID2. Accordingly, the voltage regulator controller 440 only needs to take a total time length TA' (=P1'+P2') to calibrate the output voltage Vout of the voltage regulator 430 to the new target voltage level VID3. In comparison with the situation of FIG. 3, it is clear that the periods P1' and P2' of FIG. 7 are shorter than the periods P1 and P2 of FIG. 3, and thus the voltage regulator controller 440 is capable of effectively expediting the voltage adjustment operations.

Figure 1:
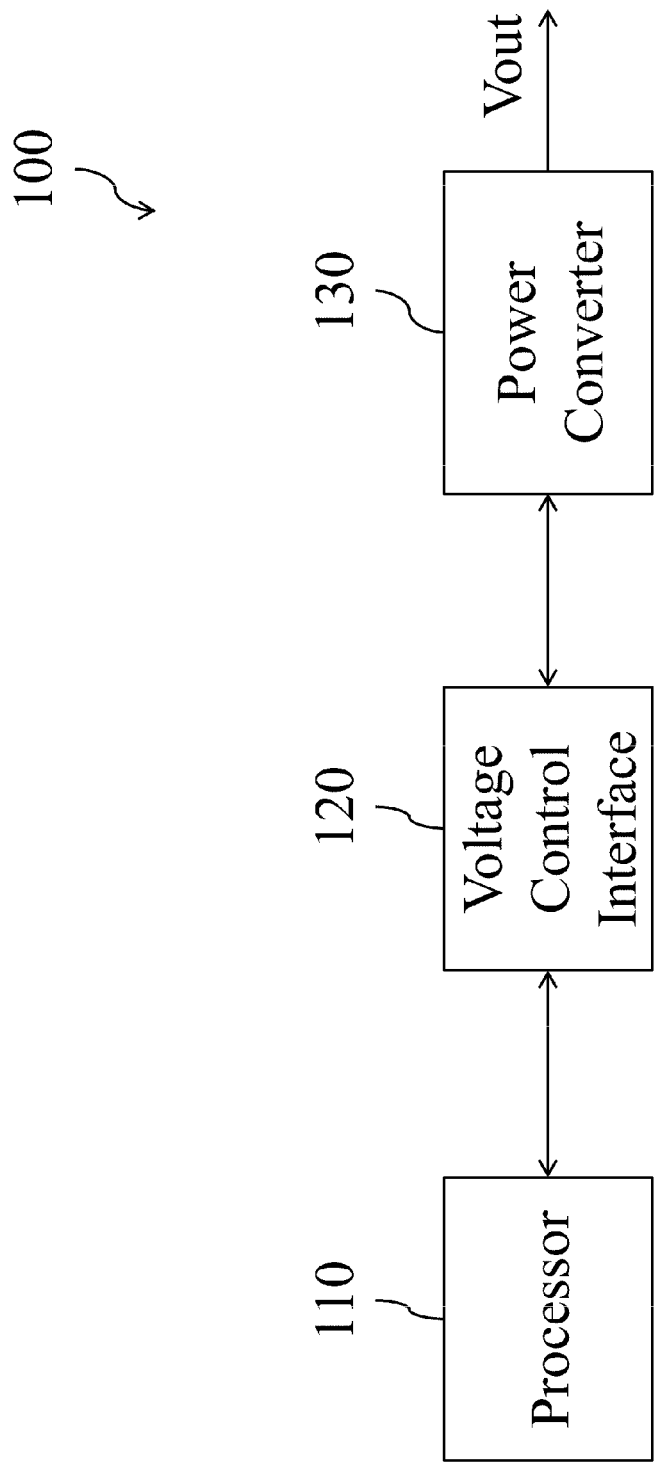
FIG. 1 is a simplified functional block diagram of a power control system in the traditional computer.
Figure 2:
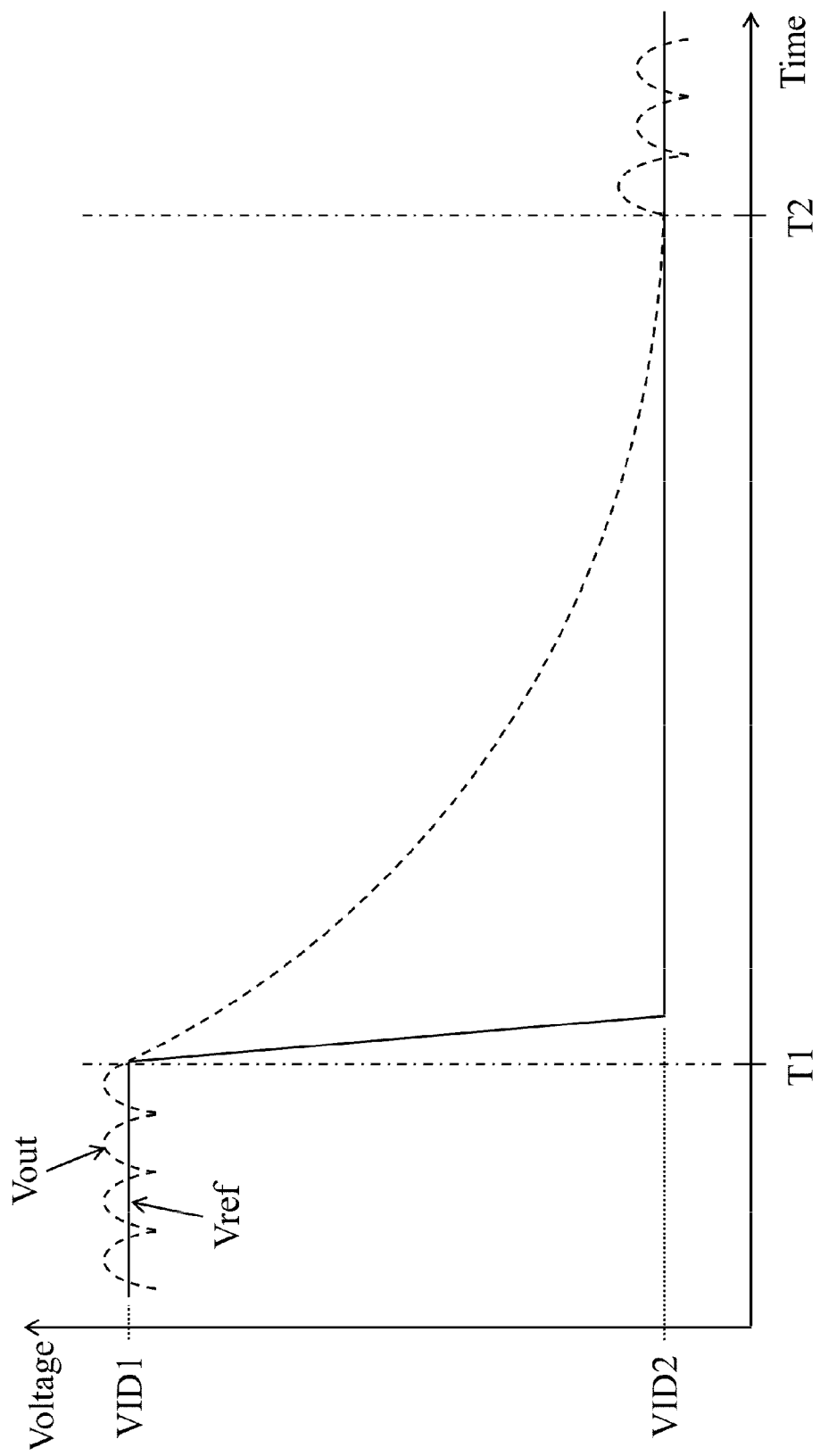
FIG. 2 is a timing diagram illustrating the change of output voltage of the power converter of FIG. 1.
Figure 3:
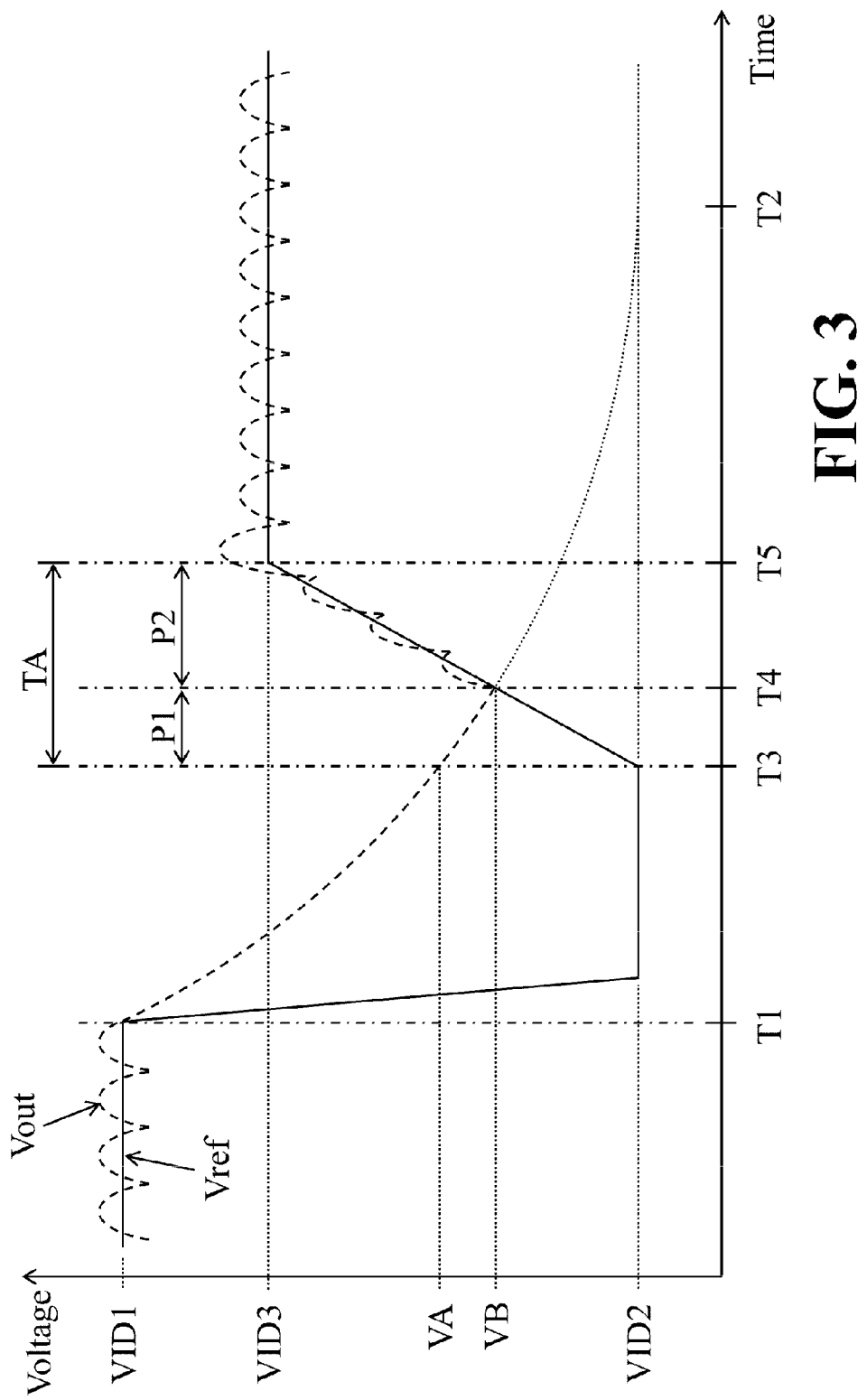
FIG. 3 is a timing diagram illustrating the change of output voltage of the power converter of FIG. 1 in another situation.

Additionally, in the period during which the control unit 452 controls the reference voltage generator 460 to increase the reference voltage Vref from the voltage level VC to the new target voltage level VID3, i.e., between the time point T3 and the time point T6, the output voltage Vout of the voltage regulator 430 gradually drops from the voltage level VA of the time point T3 to the voltage level VB' of the time point T6, but the period P1' of FIG. 7 is clearly shorter than the period P1 of FIG. 3. Thus, the voltage drop, VA−VB', of the output voltage Vout of the voltage regulator 430 in FIG. 7 is much smaller than the voltage drop, VA−VB, of the output voltage in the traditional art shown in FIG. 3. Accordingly, the disclosed voltage regulator controller 440 is also capable of effectively reducing the energy consumption, thereby improving the conversion efficiency of the power converter.

Please note that different functional blocks of the voltage regulator controller 440 may be integrated into a single circuit. Alternatively, any of those functional blocks may be implemented by multiple circuits. In addition, some signals in the specification and drawings are active high signals, but this merely an example rather than a restriction to the practical implementation. In other embodiments, each of the signals may be designed as active high or active low.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A voltage regulator controller, comprising:
    a reference voltage generator for generating a reference voltage according to a digital control signal;
    a comparison circuit, coupled with the reference voltage generator, for comparing the reference voltage with an output voltage of a voltage regulator;
    a control circuit, coupled with the reference voltage generator and the comparison circuit, for generating the digital control signal and for generating a first control signal according to a comparison result of the comparison circuit; and
    a PWM signal generator, coupled with the control circuit, for controlling the voltage regulator according to the first control signal;
    wherein when a power saving command from a voltage control interface is received by the voltage regulator controller, the PWM signal generator stops operations and the control circuit adjusts the digital control signal to stepwise lower the reference voltage.

2. The voltage regulator controller of claim 1, wherein before the voltage regulator controller receives the power saving command, the reference voltage generator maintains the reference voltage at a predetermined value according to the digital control signal.

3. The voltage regulator controller of claim 1, wherein when the voltage regulator controller receives the power saving command, the control circuit stops operations of the PWM signal generator.

4. The voltage regulator controller of claim 3, wherein the control circuit comprises:
    a control unit for adjusting the digital control signal according to the power saving command, and for utilizing a second control signal to stop the operations of the PWM signal generator; and
    a first control logic, coupled with the control unit, for generating a third control signal according to the comparison result of the comparison circuit;
    wherein when the control unit is triggered by the third control signal, the control unit controls the reference voltage generator to lower the reference voltage.

5. The voltage regulator controller of claim 3, wherein after the power saving command is received, if the voltage regulator controller receives a voltage adjustment command transmitted from the voltage control interface, the control circuit controls the reference voltage generator to increase the reference voltage.

6. The voltage regulator controller of claim 5, wherein after the voltage adjustment command is received by the voltage regulator controller, the control circuit enables the PWM signal generator to operate.

7. The voltage regulator controller of claim 5, wherein when the reference voltage is greater than or equal to the output voltage, the control circuit enables the PWM signal generator to operate.

8. The voltage regulator controller of claim 7, wherein the control circuit comprises:
    a control unit for adjusting the digital control signal according to the voltage adjustment command, and for utilizing a second control signal to enable the PWM signal generator; and
    a second control logic, coupled with the control unit, for adjusting the first control signal according to the comparison result of the comparison circuit.

9. A voltage regulator controller, comprising:
    a reference voltage generator for generating a reference voltage;
    a comparison circuit, coupled with the reference voltage generator, for comparing the reference voltage with an output voltage of a voltage regulator; and
    a control circuit, coupled with the reference voltage generator and the comparison circuit, for controlling the reference voltage generator to stepwise lower the reference voltage when a power saving command is received by the voltage regulator controller;
    wherein the control circuit comprises:
        a control unit for controlling the reference voltage generator according to the power saving command; and
        a first control logic, coupled with the control unit, for generating a third control signal according to the comparison result of the comparison circuit,
        wherein when the control unit is triggered by the third control signal, the control unit controls the reference voltage generator to lower the reference voltage.

* * * * *